United States Patent
LeBlanc et al.

(10) Patent No.: US 9,062,603 B2
(45) Date of Patent: Jun. 23, 2015

(54) FOUR BAR DRIVE MECHANISM FOR BLEED SYSTEM

(75) Inventors: Ryan Edward LeBlanc, Glastonbury, CT (US); Kevin J. Cummings, West Hartford, CT (US)

(73) Assignee: United Technologies Corporation, Hartford, CT (US)

(*) Notice: Subject to any disclaimer, the term of this patent is extended or adjusted under 35 U.S.C. 154(b) by 431 days.

(21) Appl. No.: 13/527,617

(22) Filed: Jun. 20, 2012

(65) Prior Publication Data
US 2013/0341547 A1    Dec. 26, 2013

(51) Int. Cl.
| F02C 6/08 | (2006.01) |
| F02C 7/00 | (2006.01) |
| F02C 7/20 | (2006.01) |
| F02C 7/32 | (2006.01) |
| F01D 17/10 | (2006.01) |
| F01D 17/20 | (2006.01) |

(52) U.S. Cl.
CPC ... *F02C 7/00* (2013.01); *F02C 7/20* (2013.01); *F02C 7/32* (2013.01); *F01D 17/105* (2013.01); *F01D 17/20* (2013.01); *F02C 6/08* (2013.01); *F05D 2260/50* (2013.01)

(58) Field of Classification Search
CPC .............. F02C 7/00; F02C 7/32; F02C 7/20; F01D 17/105; F01D 17/20; F05D 2260/50
USPC ........ 251/279, 205; 137/565.13; 60/782, 785, 60/796
See application file for complete search history.

(56) References Cited

U.S. PATENT DOCUMENTS

| 1,220,729 A | * | 3/1917 | Coffey et al. ................ 137/346 |
| 2,998,991 A | | 9/1961 | Spencer |
| 3,436,505 A | * | 4/1969 | McKeough .................... 218/43 |
| 3,638,428 A | | 2/1972 | Shipley et al. |
| 3,943,707 A | | 3/1976 | Nash |
| 3,960,343 A | | 6/1976 | Thompson |
| 3,999,930 A | | 12/1976 | Telbizoff |
| 4,403,912 A | | 9/1983 | Pekari et al. |
| 4,409,788 A | | 10/1983 | Nash et al. |
| 4,570,900 A | * | 2/1986 | Lonardi et al. ................ 251/58 |
| 4,698,964 A | | 10/1987 | Glancy |
| 4,761,917 A | | 8/1988 | Knecht et al. |
| 4,854,994 A | | 8/1989 | Breiter et al. |
| 4,925,151 A | | 5/1990 | Gray |
| 5,549,448 A | | 8/1996 | Langston |
| 5,899,463 A | | 5/1999 | Koch |
| 6,161,839 A | | 12/2000 | Walton et al. |

(Continued)

OTHER PUBLICATIONS

International Search Report and Written Opinion for International Application No. PCT/US2013/046060 completed on Sep. 5, 2013.

*Primary Examiner* — Marina Tietjen
(74) *Attorney, Agent, or Firm* — Carlson, Gaskey & Olds, PC (57) ABSTRACT

An actuation system for a bleed valve includes first and second bell cranks connected by a connecting link. The first bell crank has a first arm that is coupled to a bleed valve and a second arm that is coupled to the connecting link. The connecting link has a first end coupled to the second arm of the first bell crank and a second end coupled to a first arm of the second bell crank. A second arm of the second bell crank is coupled to an actuating element. Input is communicated through the actuating element to move the bleed valve between open and closed positions via the first and second bell cranks.

21 Claims, 5 Drawing Sheets

(56) References Cited

U.S. PATENT DOCUMENTS

| | | |
|---|---|---|
| 6,742,324 B2 | 6/2004 | Bachelder et al. |
| 6,802,691 B2 | 10/2004 | Chlus |
| 6,935,836 B2 | 8/2005 | Ress, Jr. et al. |
| 6,968,697 B2 | 11/2005 | Nguyen et al. |
| 7,025,563 B2 | 4/2006 | Servadio et al. |
| 7,090,462 B2 | 8/2006 | Martin et al. |
| 7,607,308 B2 | 10/2009 | Kraft et al. |
| 7,780,174 B2 | 8/2010 | Wunderlich et al. |
| 7,785,066 B2 | 8/2010 | Bil et al. |
| 7,850,419 B2 | 12/2010 | Vrljes et al. |
| 7,857,576 B2 | 12/2010 | Durocher et al. |
| 8,366,118 B2 | 2/2013 | Schilling |
| 2007/0114791 A1 | 5/2007 | Williams |
| 2009/0317229 A1 | 12/2009 | Suciu et al. |
| 2010/0047059 A1 | 2/2010 | Gentils et al. |
| 2010/0247306 A1 | 9/2010 | Merry et al. |
| 2010/0278639 A1 | 11/2010 | Hood et al. |

\* cited by examiner

FOUR BAR DRIVE MECHANISM FOR BLEED SYSTEM

BACKGROUND

Gas turbine engines include one or more compressors for pressurizing a working medium fluid, typically ambient air, which flows through a longitudinally extending compressor flow path. Under some operating conditions, it is desirable to temporarily moderate the pressure at the discharge end of the compressor to prevent or recover from compressor stall or other aerodynamic instabilities. Pressure moderation is usually effected by opening a compressor bleed valve that diverts a portion of the pressurized fluid from the discharge end of the compressor flow path into a lower pressure region. Such compressor bleed air may also be used to drive aircraft accessories and provide cooling within the aircraft.

An exemplary compressor bleed system includes a stationary bleed duct case with sealing faces and a moveable valve ring containing a pair of resilient seal members adhesively bonded or clamped into respective channels on longitudinally facing surfaces of the ring. A series of circumferentially distributed passages extend through the bleed duct case to join the compressor flow path to a surrounding annular chamber. A set of pins extends radially from the valve ring, and each pin includes a roller (a cam roller and a damper roller) that engages carved slots on a bracket attached to the bleed duct case wall. A single bell crank for operating the valve ring is mounted on a bell crank support bracket by a bell crank pivot. Input and output arms of the bell crank are connected respectively to an actuator and to the valve ring.

In operation, the actuator rotates the bell crank about the bell crank pivot so that the bell crank, in turn, drives the valve ring in a spiral motion (translating along and rotating about the engine core axis), positioning the valve ring to cover or uncover the passages. When the bell crank is rotated to force the valve ring seals against the duct sealing faces, air is sealed into the low pressure compressor flowpath. The bell crank connects to the valve with a first arm and connects to a connecting link with a second arm. The bell crank is mounted to a stiff case structure, such as the intermediate compressor case, with a bracket.

For most applications there is sufficient height and axial space to package these components. However, certain engine configurations have a limited amount of space to fit a bleed valve actuator over the intermediate compressor case, and there is not always a sufficient amount of space to couple a traditional bell crank to actuate the valve ring.

SUMMARY

According to an exemplary embodiment disclosed herein, an actuation system for a bleed valve comprises a first bell crank having a first arm and a second arm, where the first arm is coupled to a bleed valve. A connecting link has a first end and a second end, with the first end being coupled to the second arm of the first bell crank. A second bell crank has a first arm and a second arm, with the first arm being coupled to the second end of the connecting link and the second arm being coupled to an actuating element. Input is communicated through the actuating element to move the bleed valve between open and closed positions via the first and second bell cranks. In a further embodiment of the above, the first bell crank is positioned on one side of the bleed valve and the second bell crank is positioned on an opposite side of the bleed valve. In a further embodiment of any of the above, the connecting link extends over an outer radial surface of the bleed valve to connect the first and second bell cranks.

In a further embodiment of any of the above, the second arm of the first bell crank is radially outward of the first arm of the first bell crank.

In a further embodiment of any of the above, the first arm of the second bell crank is radially outward of the second arm of the second bell crank.

In a further embodiment of any of the above, the second arm of the first bell crank is radially outward of the first arm of the first bell crank, and wherein the first arm of the second bell crank is radially outward of the second arm of the second bell crank.

In a further embodiment of any of the above, the first and second arms of the first bell crank are separated from each other by an obtuse angle.

In a further embodiment of any of the above, the first and second arms of the second bell crank are separated from each other by an acute angle.

In a further embodiment of any of the above, the first and second arms of the first bell crank are separated from each other by a first radial distance and the first and second arms of the second bell crank are separated from each other by a second radial distance greater than the first radial distance.

In a further embodiment of any of the above, a first mount is coupled to the first bell crank to define a first pivot and a second mount is coupled to the second bell crank to define a second pivot.

In a further embodiment of any of the above, the first mount is configured for attachment to a casing in a compressor section and the second mount is configured for attachment to a bleed duct case.

In a further embodiment of any of the above, a bridge plate connects the first and second mounts.

According to an exemplary embodiment disclosed herein, a bleed valve assembly for a compressor section of a gas turbine engine comprises a bleed valve that is movable between an open and a closed position and a bleed duct case that includes a plurality of passages, wherein the bleed valve engages the bleed duct case to close the plurality of passages when in the closed position and moves away from the bleed duct case to uncover the plurality of passage when in the open position. A first bell crank has a first arm and a second arm, with the first arm being coupled to the bleed valve. A connecting link has a first end and a second end, with the first end being coupled to the second arm of the first bell crank. A second bell crank is supported by the bleed duct case and has a first arm and a second arm, with the first arm being coupled to the second end of the connecting link and the second arm being coupled to an actuating element. Input is communicated through the actuating element to move the bleed valve between the open and closed positions via the first and second bell cranks.

In a further embodiment of any of the above, the first and second arms of the first bell crank are separated from each other by an obtuse angle.

In a further embodiment of any of the above, the first and second arms of the second bell crank are separated from each other by an acute angle.

In a further embodiment of any of the above, the first and second arms of the first bell crank are separated from each other by a first radial distance and wherein the first and second arms of the second bell crank are separated from each other by a second radial distance greater than the first radial distance such that the connecting link extends between the first and second bell cranks at a radially outward position relative to the bleed valve and bleed duct case.

In a further embodiment of any of the above, a first mount is coupled to the first bell crank to define a first pivot and a second mount is coupled to the second bell crank to define a second pivot, wherein the first mount is fixed to a casing in a compressor section and the second mount is fixed to the bleed cut case.

In a further embodiment of any of the above, a fire wall is fixed to the casing and a stand-off is mounted to one side of the fire wall and a spool mounted to the stand-off. The actuating element comprises an actuating link that extends through the stand-off and spool to connect to an actuating mechanism.

In a further embodiment of any of the above, the spool comprises a cylinder.

In a further embodiment of any of the above, a bridge plate connects the first and second mounts.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION

Figure 1:
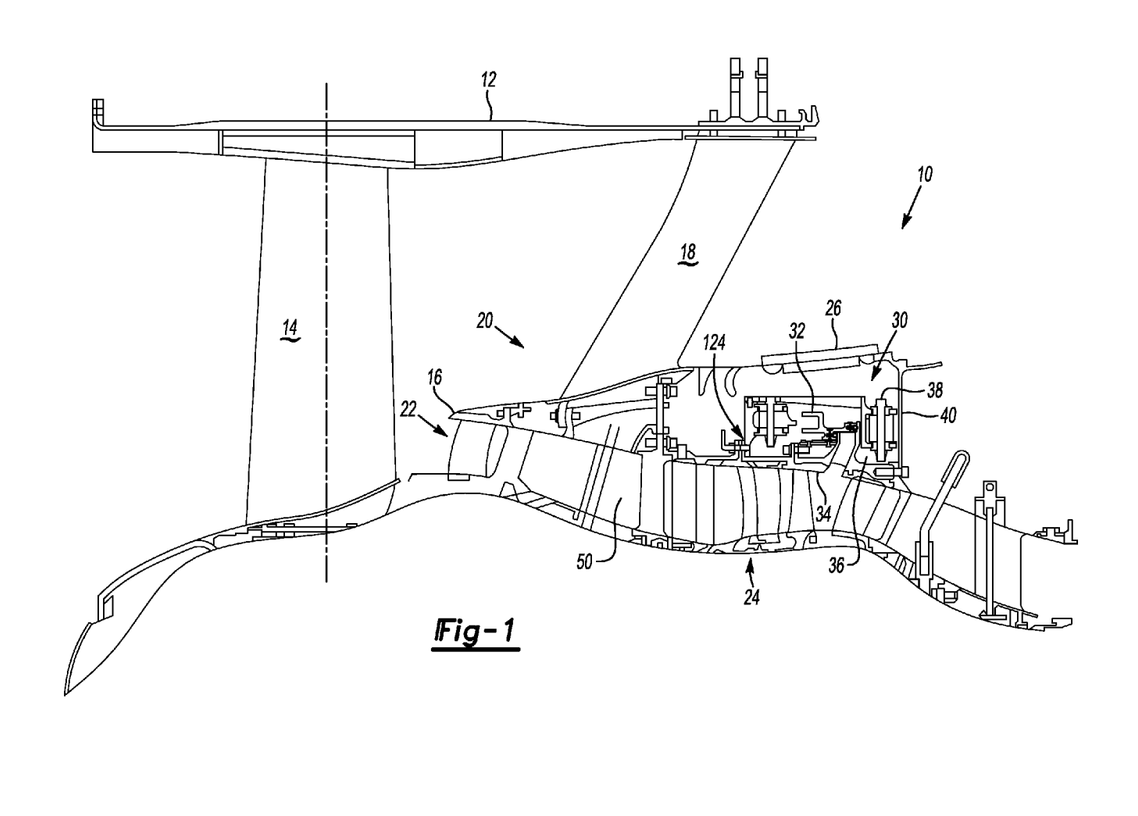
FIG. 1 is a cross-section of a portion of a gas turbine engine.

Referring now to FIG. 1, an engine 10, such as a gas turbine engine is shown. The engine 10 has a fan case 12 that extends around blades 14. The blades 14 are attached to a shaft (not shown) passing through a core 16 of the engine 10. The core 16 is held in place by engine mounts (not shown) and also by struts 18. The blades 14 provide a first airflow 20 between the core 16 and the fan case 12, and a second airflow 22 passing through a compressor section 24 in the core 16. The core 16 is enclosed by a core casing 26. A bleed assembly 30 is disposed between the core casing 26 and the compressor section 24. The bleed assembly 30 includes a ring-shaped bleed valve 32, a ring-shaped bleed duct assembly 34 that acts as a portion of a compressor section outer wall, bleed ducts or passages 36 passing through the bleed duct assembly 34, a linkage assembly 38, and a firewall 40.

Figure 2:
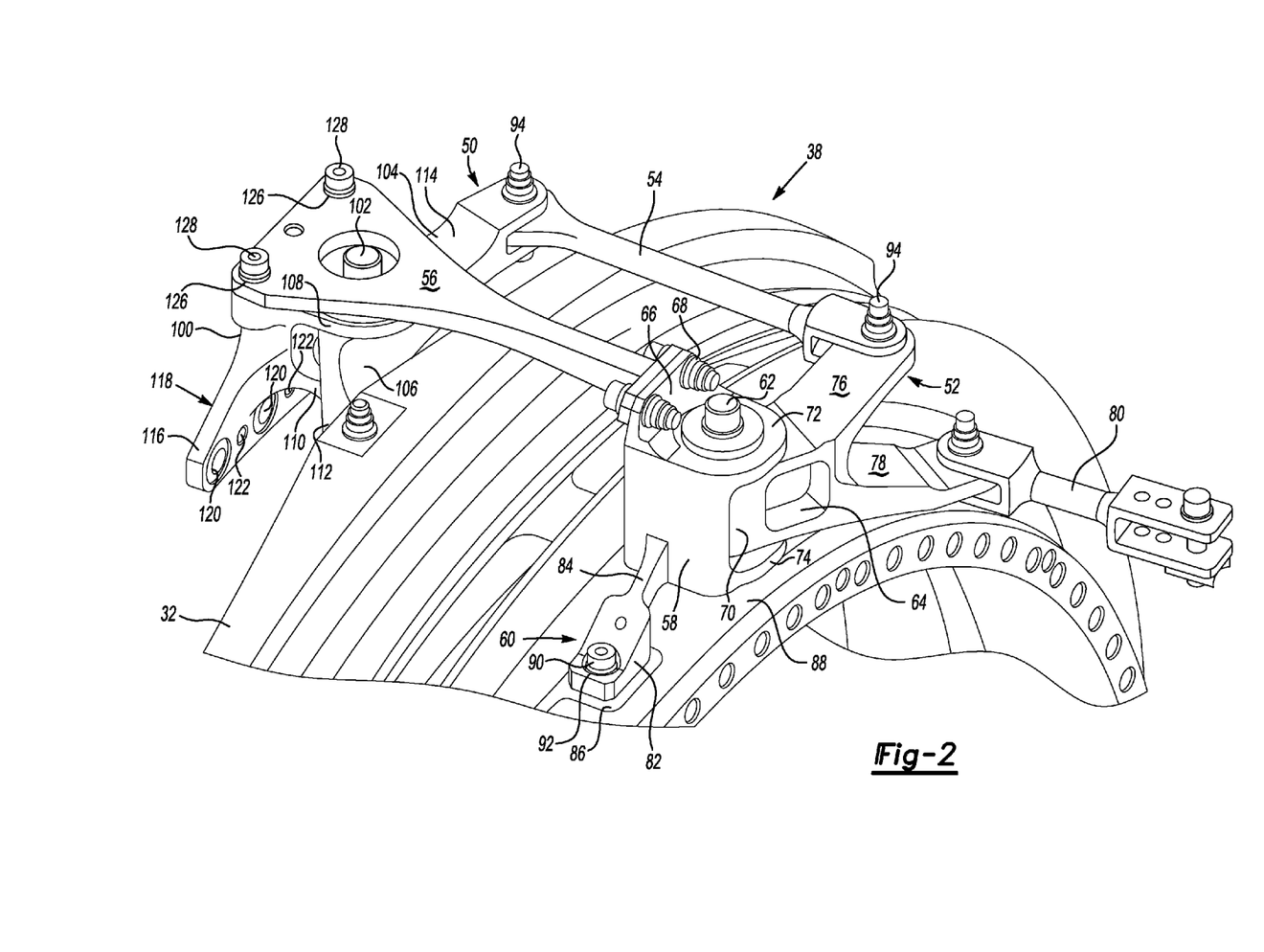
FIG. 2 is a perspective view of a dual bell crank for opening and closing of the valve depicted in FIG. 1.

The linkage assembly 38 is shown in greater detail in FIG. 2. The linkage assembly 38 has a fore bell crank assembly 50, an aft bell crank assembly 52, a fore connecting link 54, and a bridge arm 56.

The aft bell crank assembly 52 has an aft mount comprising stationary body member 58 from which arms 60 extend circumferentially therefrom. Only one arm 60 is shown in FIG. 2. A second arm that is similar to the first arm 60 extends outwardly on an opposite side of the body member 58 from the first arm 60. A bolt 62 extends through the body member 58 to hold an aft bell crank 64. The body member 58 has a flange 66 extending radially outwardly therefrom. The flange 66 has holes 68 passing axially therethrough for joining with the bridge arm 56. The aft bell crank 64 includes a base portion 70 that is seated between a radially outward portion 72 and a radially inward portion 74 of the body member 58. The aft bell crank 64 has a radially outward arm 76 for attaching to the fore connecting link 54 and a radially inward arm 78, spaced from the radially outward arm 76 by a gap, which attaches to an aft connecting link 80. The aft connecting link 80 attaches to an actuator.

The arm 60 has a base 82 and a web 84 that extends from the base 82 to attach to the body member 58. The base 82 of the arm 60 sits upon a land 86 on a bleed duct case 88. A fastener 90 is inserted into a hole 92 in the base 82 to connect the arm 60 to the bleed duct case 88.

The fore bell crank assembly 50 has a fore mount comprising a stationary fore body member 100. A bolt 102 extends through the fore body member 100 to hold a fore bell crank 104. The fore bell crank 104 includes a base portion 106 that is seated between a radially outward portion 108 and a radially inward portion 110 of the body member 100. The fore bell crank 104 has a first arm 112 that is attached to the bleed valve 32 and a second arm 114 that attaches to the fore connecting link 54. Bolts 94 connect first and second ends of the fore connecting link 54 to the fore bell crank 104 and the aft bell crank 64.

The body member 100 has a lower flange 116 that forms a bracket 118 having openings 120. Pin openings 122 are utilized to locate the bracket 118 in an adjacent core segment flange 124 (see FIG. 1) and openings 120 are used to secure the mount to a casing of the compressor. The body member 100 has holes 126 that receive fasteners 128 to secure bridge arm 56 thereto. The second arm 114 is angularly displaced from the first arm 112 so that the bleed valve 32 moves an appropriate amount as desired to meter flow through the bleed duct assembly 34.

Figure 3A:
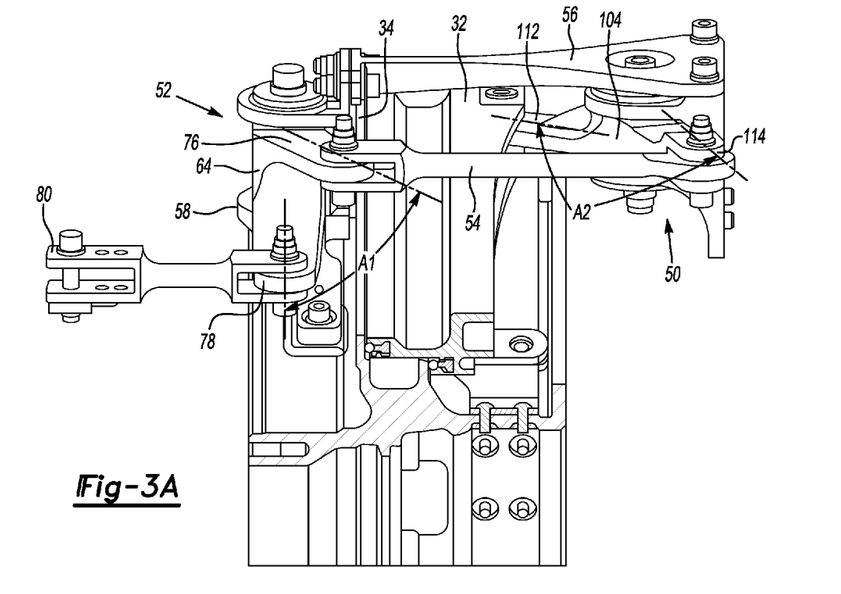
FIG. 3A is a schematic representation of the dual bell crank in a valve closed position. (should there be a schematic of the actual flow ports in the duct . . . it all looks solid)
Figure 3B:
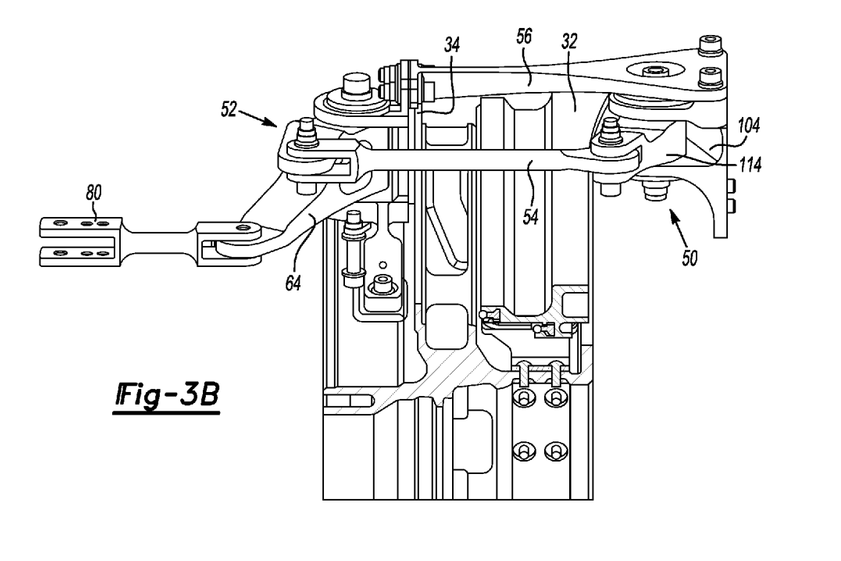
FIG. 3B is a schematic representation of the dual bell crank in a valve open position. (should there be a schematic of the actual flow ports in the duct . . . it all looks solid)

FIGS. 3A and 3B schematically show the fore bell crank assembly 50, aft bell crank assembly 52, and connecting link 54 as these components move between open and closed positions. FIG. 3A shows the position these components are in when the bleed valve 32 is in the closed position with the valve 32 engaging a flange of the bleed duct assembly 34 and FIG. 3B shows the position these components are in when the bleed valve 32 is in the open position with the valve 32 disengaged from the flange. When in the open position ducts or passages allow for bleeding of a portion of the working mediate from the primary flow path within the core to the secondary flow path around the core. When in the closed position, air is sealed from escaping through the bleed system. Examples of a sealing configuration for a bleed valve are set forth in application Ser. Nos. 13/527,744, 13/527,770, 13/527,793, 13/527,682, and 13/527,887, filed on an even date herewith, which are assigned to the same assignee of the subject application, and which are hereby incorporated by reference.

In one example, the first 76 and second 78 arms of the aft bell crank assembly 52 are separated from each other by an acute angle A1 as best shown in FIGS. 3A-3B. This angle configuration facilitates packaging of the bell crank; however, other angle configurations could also be used. In one example, the first 112 and second 114 arms of the fore bell crank assembly 50 are separated from each other by an obtuse angle A2. The obtuse angle opens the valve when the actuator retracts. Optionally, the arms could be separated by an acute angle that would operate in a manner opposite of the obtuse angle configuration. These angles A1 and A2 are fixed and remain constant as the bell cranks pivot between the open and closed positions. Further, the first 76 and second 78 arms of the aft bell crank assembly 52 are spaced radially apart from each other by a greater distance than that between the first 112 and second 114 arms of the fore bell crank assembly 50. The distances between the arms can vary as needed to accommodate different configurations; however, the separation distance between the arms 112, 114 of the fore bell crank could be minimal or the arms could be essentially in the same plane to provide an even more compact configuration. The height arrangement in combination with the angular arrangement of the pair of bell cranks allows the drive input from the actuator to be reacted radially outwardly and over the valve via the connecting link 54 such that the fore bell crank 104 can drive the valve motion. In addition, this configuration is easily packaged within the space just forward of the intermediate compressor case firewall 40 as shown in FIG. 1.

Figure 4:
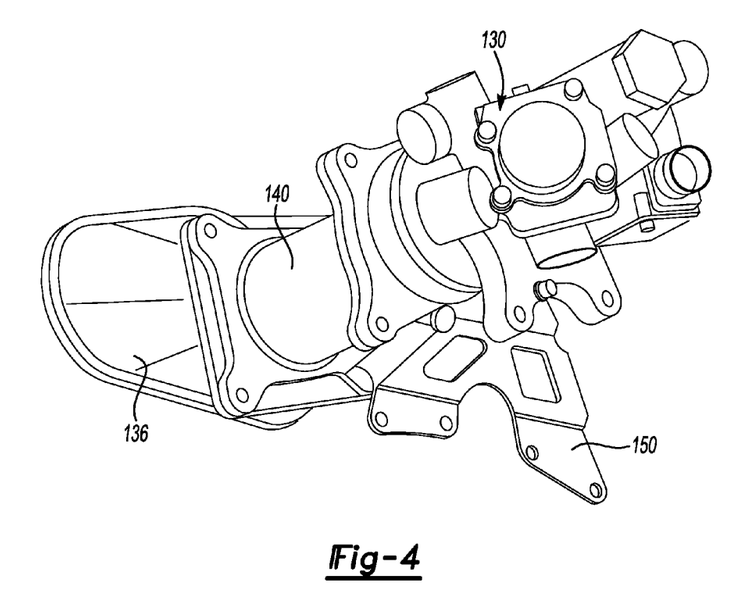
FIG. 4 is a perspective view of a bleed actuator mounted to a firewall via a spool piece.
Figure 5:
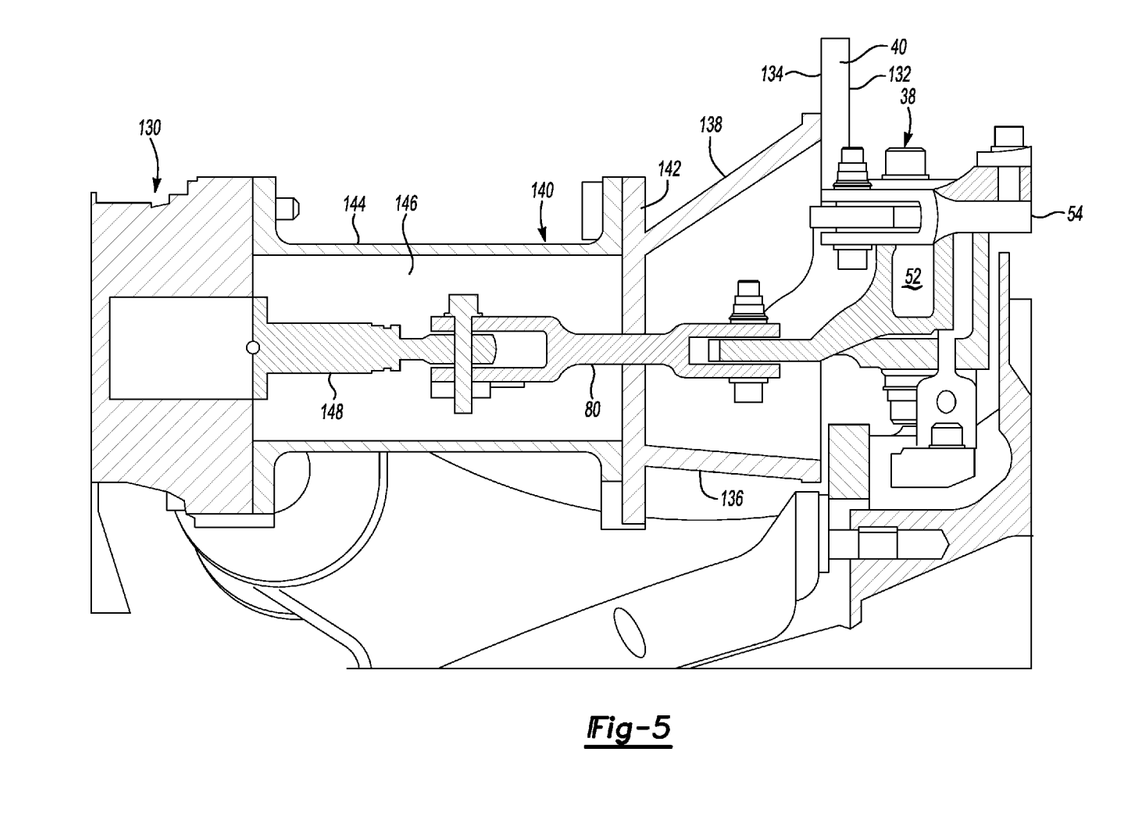
FIG. 5 is a cross-sectional view of FIG. 4.

As shown in FIGS. 4-5, an actuating mechanism 130 is positioned on an opposite side of the firewall 40 from the linkage assembly 38. The firewall 40 includes a fore side 132 facing a fan section of the engine and an aft side 134 facing a turbine section of the engine. A stand-off 136 is mounted to the aft side 134 of the firewall 40. The stand-off 136 has a tapered wall 138 that increases in diameter in a forward direction, i.e. in a fore direction. The aft bell crank assembly 52 extends into a cavity defined by the tapered wall 138. A spool 140 is mounted to an aft end flange 142 of the stand-off 136. The spool 140 comprises a cylindrical body 144 with an internal cavity 146 through which the actuating link 80 extends to connect to a mechanism link 148 that is driven by the actuating mechanism 130. A secondary support bracket 150 provides additional support for the actuating mechanism 130 relative the case structure.

The four-bar, dual bell crank system solves difficult packaging issues presented by new engine configurations with more compact designs. The actuator load is transferred outboard while preserving good mechanical advantage in the system, in addition to minimizing side load in the actuator. The linkage assembly is easily adjustable to provide optimal mechanical advantage. Further, there is decreased actuator load and stroke and there are no axial loads into the bell crank pivots. Further, the actuator radius is maintained compared to prior designs The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An actuation system for a bleed valve comprising:
   a first bell crank having a first arm and a second arm, the first arm being coupled to a bleed valve;
   a connecting link having a first end and a second end, the first end being coupled to the second arm of the first bell crank; and
   a second bell crank having a first arm and a second arm, the first arm being coupled to the second end of the connecting link and the second arm being coupled to an actuating element, and wherein input is communicated through the actuating element to move the bleed valve between open and closed positions via the first and second bell cranks.

2. The actuation system of claim 1 wherein the first bell crank is positioned on one side of the bleed valve and the second bell crank is positioned on an opposite side of the bleed valve.

3. The actuation system of claim 2 wherein the connecting link extends over an outer radial surface of the bleed valve to connect the first and second bell cranks.

4. The actuation system of claim 3 wherein the second arm of the first bell crank is radially outward of the first arm of the first bell crank.

5. The actuation system of claim 3 wherein the first arm of the second bell crank is radially outward of the second arm of the second bell crank.

6. The actuation system of claim 3 wherein the second arm of the first bell crank is radially outward of the first arm of the first bell crank, and wherein the first arm of the second bell crank is radially outward of the second arm of the second bell crank.

7. The actuation system of claim 1 wherein the first and second arms of the first bell crank are separated from each other by an obtuse angle.

8. The actuation system of claim 7 wherein the first and second arms of the second bell crank are separated from each other by an acute angle.

9. The actuation system of claim 1 wherein the first and second arms of the first bell crank are separated from each other by a first radial distance and wherein the first and second arms of the second bell crank are separated from each other by a second radial distance greater than the first radial distance.

10. The actuation system of claim 1 including a first mount coupled to the first bell crank to define a first pivot and a second mount coupled to the second bell crank to define a second pivot.

11. The actuation system of claim 10 wherein the first mount is configured for attachment to a casing in a compressor section and the second mount is configured for attachment to a bleed duct case.

12. The actuation system of claim 11 including a bridge plate connecting the first and second mounts.

13. A bleed valve assembly for a compressor section of a gas turbine engine comprising:
    a bleed valve movable between an open and a closed position;
    a bleed duct case including a plurality of passages, wherein the bleed valve engages the bleed duct case to close the plurality of passages when in the closed position and moves away from the bleed duct case to uncover the plurality of passage when in the open position;
    a first bell crank having a first arm and a second arm, the first arm being coupled to the bleed valve;
    a connecting link having a first end and a second end, the first end being coupled to the second arm of the first bell crank; and
    a second bell crank supported by the bleed duct case and having a first arm and a second arm, the first arm being coupled to the second end of the connecting link and the second arm being coupled to an actuating element, and wherein input is communicated through the actuating element to move the bleed valve between the open and closed positions via the first and second bell cranks.

14. The bleed valve assembly of claim 13 wherein the first and second arms of the first bell crank are separated from each other by an obtuse angle.

15. The bleed valve assembly of claim 14 wherein the first and second arms of the second bell crank are separated from each other by an acute angle.

16. The bleed valve assembly of claim 13 wherein the first and second arms of the first bell crank are separated from each other by a first radial distance and wherein the first and second arms of the second bell crank are separated from each other by a second radial distance greater than the first radial distance such that the connecting link extends between the first and second bell cranks at a radially outward position relative to the bleed valve and bleed duct case.

17. The bleed valve assembly of claim 13 including a first mount coupled to the first bell crank to define a first pivot and a second mount coupled to the second bell crank to define a second pivot, wherein the first mount is fixed to a casing in a compressor section and the second mount is fixed to the bleed duct case.

18. The bleed valve assembly of claim 17 including a fire wall that is fixed to the casing, and including a stand-off mounted to one side of the fire wall and a spool mounted to the stand-off, and wherein the actuating element comprises an actuating link that extends through the stand-off and spool to connect to an actuating mechanism.

19. The bleed valve assembly of claim 18 wherein the spool comprises a cylinder.

20. The bleed valve assembly of claim 17 including a bridge plate connecting the first and second mounts.

21. The actuation system of claim 1 wherein the second arm of the first bell crank is actuated by the actuating element via the second bell crank and connecting link.

\* \* \* \* \*